(12) United States Patent  
Kritt et al.

(10) Patent No.: US 7,696,857 B2  
(45) Date of Patent: Apr. 13, 2010

(54) METHOD AND SYSTEM FOR DISABLING AN ELECTRONIC DEVICE UPON THEFT

(75) Inventors: Barry Alan Kritt, Raleigh, NC (US); Thomas S. Mazzeo, Durham, NC (US); Rodney Edward Shepard, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 11/424,053

(22) Filed: Jun. 14, 2006

(65) Prior Publication Data

US 2008/0001705 A1 Jan. 3, 2008

(51) Int. Cl.
*G06F 7/04* (2006.01)

(52) U.S. Cl. ............... 340/5.31; 340/568.2; 340/572.3

(58) Field of Classification Search ............... 340/5.31, 340/5.74
See application file for complete search history.

(56) References Cited

U.S. PATENT DOCUMENTS

| | | | |
|---|---|---|---|
| 5,231,375 A | 7/1993 | Sanders et al. | |
| 5,388,156 A | 2/1995 | Blackledge, Jr. et al. | |
| 5,406,260 A | 4/1995 | Cummings et al. | |
| 5,406,261 A | 4/1995 | Glenn | |
| 5,574,786 A | 11/1996 | Dayan et al. | |
| 5,675,321 A * | 10/1997 | McBride | 340/568.2 |
| 5,754,108 A | 5/1998 | Ungarsohn | |
| 5,949,882 A * | 9/1999 | Angelo | 713/185 |
| 6,026,492 A | 2/2000 | Cromer et al. | |
| 6,226,165 B1 | 5/2001 | Collins et al. | |
| 6,288,645 B1 * | 9/2001 | McCall et al. | 340/568.2 |
| 6,307,470 B1 | 10/2001 | Shirakawa | |
| 6,389,853 B1 * | 5/2002 | Pate et al. | 70/18 |

OTHER PUBLICATIONS

Irazabal, "AN10216-01 I2C Manual" Mar. 2003, Philips Semiconductors, pp. 1-51 (from Applicant's IDS).*
"I2C", pp. 1-3, retrieved May 2, 2006 http://www.semiconductors.philips.com/products/interface_control/i2c//.
"Introduction to using I2C", pp. 1-2, retrieved May 2, 2006 http://www.standardics.philips.com/support/i2c/usage/.
Irazabal et al., "AN10216-01 I2C Manual" Mar. 24, 2003, Philips Semiconductors, pp. 1-51.

* cited by examiner

*Primary Examiner*—Daniel Wu
*Assistant Examiner*—Nay Tun
(74) *Attorney, Agent, or Firm*—Yee & Associates, P.C.; Steven L. Bennett

(57) ABSTRACT

A system for disabling a device. An embedded identifier contained within a cable security system is read in response to enabling a cable security mechanism within the device. The device is disabled if the embedded identifier is not found.

19 Claims, 3 Drawing Sheets

METHOD AND SYSTEM FOR DISABLING AN ELECTRONIC DEVICE UPON THEFT

BACKGROUND OF THE INVENTION

1. Field of the Invention

The present invention relates generally to an improved electronic device security system. More specifically, the present invention is directed to a method, system, and computer usable program code to disable an electronic device upon theft.

2. Description of the Related Art

Currently, there is an ever increasing need to provide security for electronic devices against the unauthorized removal or theft of these electronic devices. The high cost and portability of such electronic devices results in the higher risk of theft. Electronic devices, such as, for example, laptop computers, stereos, and televisions, are a frequent target for theft from homes, offices, stores, college dorm rooms, and libraries. Some electronic devices, such as projectors, are even more at risk of theft because projectors are frequently left unattended in conference rooms.

In addition, security is required to prevent the theft of data contained on electronic devices, such as personal and laptop computers. Theft of the computer itself sometimes is not as great a loss as the data contained therein. The data may be of such significance as to warrant extreme measures in protecting it. As a result, deterrence of and protection from theft of computer data is of paramount importance to all who use computer systems as well.

Accordingly, a number of methods have been developed for guarding against the unauthorized removal of electronic equipment and the data contained therein. One such method of protection is anchoring the electronic device to a desktop, or other immovable object, with a locking cable mechanism. While this method provides a physical deterrent to theft, the cable can be cut and the electronic device removed with the cable system lock still attached to the electronic device. Since the electronic device can still operate, the electronic device is still of value to the thief.

Another method is the use of a key lock switch on the front panel of a computer itself to protect the data contained therein. However, a determined thief can bypass the computer disable key lock switch. Encoding data may be another method of safeguarding computer records but requires extra enciphering and deciphering programs which increase access decoding and storage encoding time when a user wants to work with the data.

Another method of protection includes the attachment of non-removable tags to the electronic devices. This method requires the use of sensing devices that are responsive to the non-removable tags. These tag sensing devices are located at exits from the premises where the electronic devices are located. However, these tag sensing devices are rather expensive. Consequently, this method is generally not very feasible, especially when multiple exit points exist.

Another method of theft protection includes sensing a current loop coupled to the protected electrical device. This method includes a plurality of electronic tethers which are connected to individual pieces of protected equipment by way of connectors which in turn are bonded to the surface of the protected equipment. Each tether includes a pair of conductors which are connected together to form a closed current loop via a series of resistor and conductive foil, which is adhesively bonded to the outside of the equipment. However, it is conceivable that a thief may carefully remove the current loop without detection.

Therefore, it would be beneficial to have a method, system, and computer useable program code for disabling electrical devices upon theft and ensuring that the data contained within the stolen electronic devices cannot be retrieved by unauthorized persons.

BRIEF SUMMARY OF THE INVENTION

Illustrative embodiments provide a method, system, and computer useable program code for disabling a device. An embedded identifier contained within a cable security system is read in response to enabling a cable security mechanism within the device. The device is disabled if the embedded identifier is not found.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
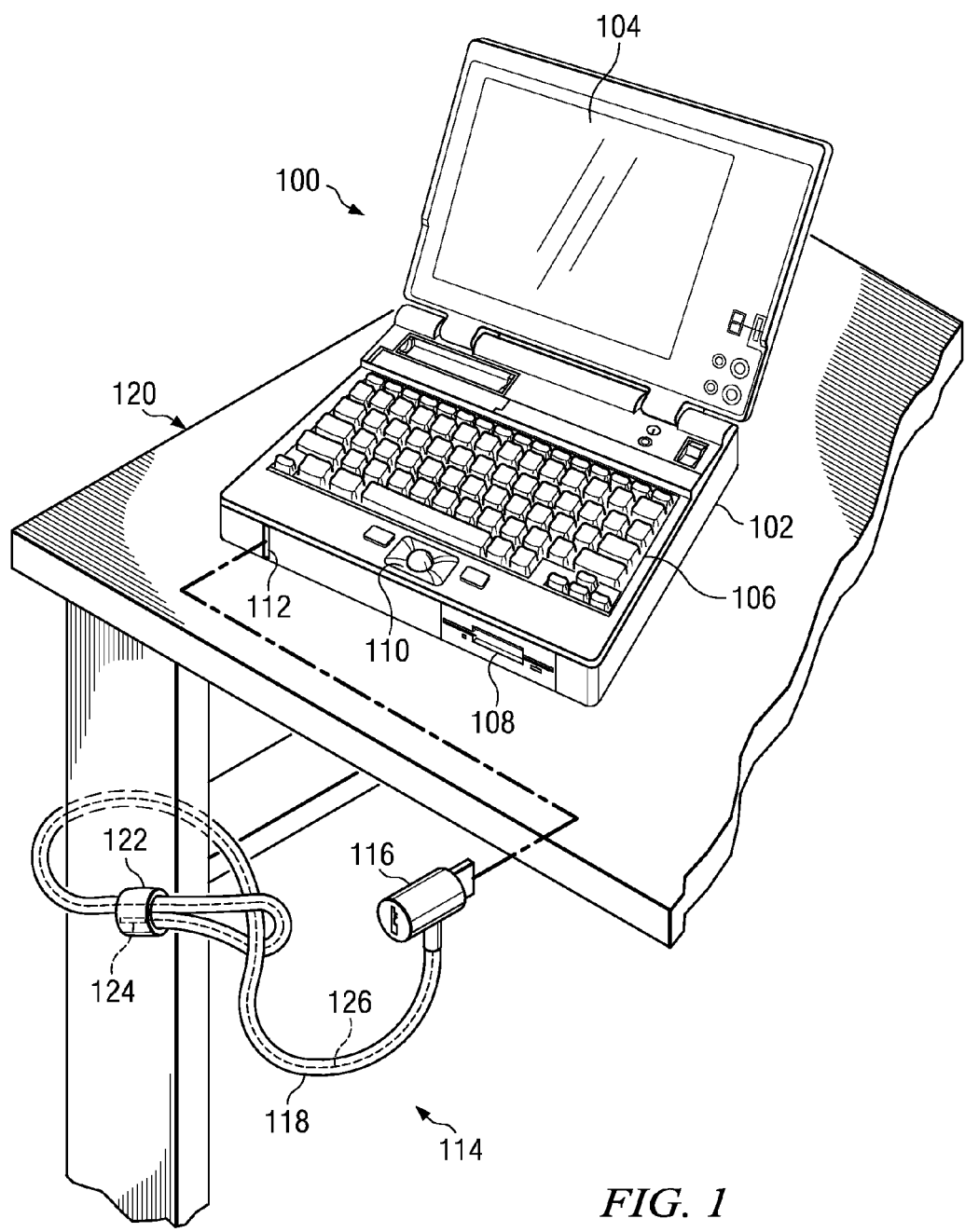
FIG. 1 is a pictorial representation of a laptop computer and cable security system in which illustrative embodiments may be implemented.

With reference now to the figures and in particular with reference to FIG. 1, a pictorial representation of a laptop computer and cable security system in which illustrative embodiments may be implemented is depicted. Laptop computer 100 is depicted which includes system unit 102, video display terminal 104, keyboard 106, storage devices 108, which may include floppy drives and other types of permanent and removable storage media, and pointer device 110. Additional input devices may be included with laptop computer 100, such as, for example, a mouse, joystick, touch screen, trackball, microphone, and the like. Laptop computer 100 may be implemented using any suitable computer, such as an IBM® Thinkpad computer, which is a product of International Business Machines Corporation, located in Armonk, N.Y. Laptop computer 100 also preferably includes a graphical user interface (GUI) that may be implemented by means of systems software residing in computer readable media in operation within laptop computer 100.

Further, laptop computer 100 includes lock port 112. Laptop computer 100 uses lock port 112 to mechanically connect laptop computer 100 to a locking system, such as cable security system 114, to prevent the theft of laptop computer 100. In addition, laptop computer 100 uses lock port 112 to electrically couple laptop computer 100 to cable security system 114. Lock port 112 is electrically coupled to laptop computer 100 via, for example, sensors within laptop computer 100 that are coupled to lock port 112. It should be noted that lock port 112 is located on the front edge of laptop computer 100 for illustrative purposes only and is not intended as a structural limitation for illustrative embodiments. Lock port 112 may be located anywhere on laptop computer 100 that is suitable for processes of illustrative embodiments.

Furthermore, it should be noted that laptop computer 100 is only shown for illustrative purposes. Laptop computer 100 may represent any type of electronic device, such as, for example, a personal computer, a personal digital assistant, a television, a video projector, a stereo system, and a digital video disc player, which may be at risk of theft. All of these exemplary electronic devices that utilize illustrative embodiments are equipped with a lock port, such as lock port 112, for coupling the electronic device with cable security system 114.

A user employs cable security system 114 to physically deter would-be thieves from stealing electronic devices utilizing illustrative embodiments. Cable security system 114 includes lock 116 and cable 118. Lock 116 is designed to securely fit and lock into lock port 112. In addition, cable security system 114 uses lock 116 to mechanically and electrically couple with laptop computer 100 via lock port 112.

Cable security system 114 utilizes cable 118, which is connected to lock 116, to secure laptop computer 100 to an immovable object, such as, for example, table 120 when lock 116 is inserted into lock port 112. A user uses cable security system 114 to secure laptop computer 100 to table 120 by passing cable 118 around the leg of table 120 and then passing lock 116 through a loop in the end of cable 118 created by collar 122. After passing lock 116 through the loop in the end of cable 118, the user inserts lock 116 into lock port 112, thereby securing laptop computer 100 to table 120 to prevent theft.

Collar 122 is not only used to create the loop at the distal end of cable 118, which is the end opposite lock 116, but also is used to protect embedded identification chip 124. Embedded identification chip 124 is embedded within cable 118 at the distal end opposite lock 116. Embedded identification chip 124 is embedded within cable 118 and is placed under collar 124 to prevent tampering by would-be thieves. Embedded identification chip 124 may be connected to, for example, an $I^2C$ bus, which is a product available from Koninklijke Philips Electronics N.V., located in Eindhoven, Netherlands. However, it should be noted that the $I^2C$ bus is only used for illustration purposes and is not intended as a structural limitation of illustrative embodiments. Also, illustrative embodiments may utilize any type of identification chip that is capable of performing processes of illustrative embodiments while embedded within cable 118. Embedded identification chip 124 may contain, for example, an alphanumeric identification number which is used to uniquely identify cable security system 114. Using an alphanumeric identification number that uniquely identifies cable security system 114 prevents a would-be thief from removing cable security system 114 and replacing cable security system 114 with a different cable security system. However, it should be noted that illustrative embodiments are not restricted to the use of an alphanumeric identification number for identification of cable security system 114. Illustrative embodiments may utilize any type of identification means within embedded identification chip 124 to identify cable security system 114.

Cable security system 114 also includes embedded electrical wire 126. Embedded electrical wire 126 is embedded within cable 118 and runs the length of cable 118. In other words, embedded electrical wire 126 runs from lock 116, which is at one end of cable 118, to embedded identification chip 124, which is in the opposite end of cable 118. Embedded electrical wire 126 is embedded within cable 118 to prevent tampering by would-be thieves.

Cable security system 114 uses embedded electrical wire 126 to electrically couple lock 116 to embedded identification chip 124. As a result, when cable security system 114 is connected to laptop computer 100 via lock 116 and lock port 112, laptop computer 100, using illustrative embodiments, is coupled to embedded identification chip 124. Laptop computer 100 uses, for example, sensors to detect lock 116 in lock port 112 and to read the alphanumeric identification number contained in embedded identification chip 124. The sensors may be, for example, mechanical, electrical, optical, or any combination thereof. Consequently, if a thief severs embedded electrical wire 126 in an attempt to steal laptop computer 100, while the cable security mechanism is enabled within laptop computer 100, the sensors within laptop computer 100 will no longer have the ability to read the alphanumeric identification number contained within embedded identification chip 124.

Laptop computer 100 uses the cable security mechanism to disable laptop computer 100 upon theft, which is when the sensors no longer read the alphanumeric identification number contained within embedded identification chip 124 or when a different alphanumeric identification number is read by the sensors. The cable security mechanism within laptop computer 100 may include, for example, a sensors unit, an enable/disable unit, and a storage unit. The cable security mechanism may use the sensors unit to detect lock 116 in lock port 112 and to read the alphanumeric identification number contained in embedded identification chip 124. The cable security mechanism may use the enable/disable unit to enable and disable operation of laptop computer 100 depending upon the output of the sensors unit. The cable security mechanism may use the storage unit to store a copy of the alphanumeric identification number in order to compare the stored copy with the alphanumeric identification number read in embedded identification chip 124.

A user may enable the cable security mechanism within laptop computer 100 by, for example, selecting an enable option on a cable security options window displayed on video display terminal 104. The user may select the enable option on the cable security options window by, for example, using an input device, such as keyboard 106 and/or pointer device 110. The cable security options window may, for example, automatically appear in video display terminal 104 when cable security system 114 is inserted within laptop computer 100 for the first time.

Alternatively, the manufacturer may enable the cable security mechanism within laptop computer 100, or any other electronic device containing illustrative embodiments, at the time of manufacture. Enablement by the manufacturer of the cable security mechanism within the electronic device may be especially true if cable security system 114 is sold with the electronic device and/or the electronic device has limited or no user input capability. In addition, the manufacturer may, for example, input and store the alphanumeric identification number contained within embedded identification chip 124 in a non-volatile storage device contained within laptop computer 100. Alternatively, a user may input and store the alphanumeric identification number for cable security system 114 during initial installation and setup of cable security system 114 within laptop computer 100. Or, laptop computer 100 may, for example, automatically read and store the alphanumeric identification number contained within embedded identification chip 124 in non-volatile storage each time laptop computer 100 is powered off.

When laptop computer 100 is powered on, laptop computer 100 may, for example, compare the stored alphanumeric identification number in non-volatile memory with the alphanumeric identification number read on embedded identification chip 124. If a match of the stored and read alphanumeric identification numbers is found, then laptop computer 100 continues to operate in a normal fashion. However, if a match is not found, then laptop computer 100 may, for example, enter a "protect mode." Occurrences of a match not being found by laptop computer 100 may be, for example, when electrical wire 126 is severed preventing laptop computer 100 from reading the alphanumeric identification number contained in embedded identification chip 124. Or, when laptop computer 100 reads a different alphanumeric identification number than the one stored in non-volatile memory because a different cable security system was inserted within lock port 112. Or, when a different cable security system is inserted within lock port 112 that does not have an embedded identification chip containing an alphanumeric identification number.

While in the protect mode, operation of laptop computer 100 is disabled. The protect mode may include, for example, halting normal operation of laptop computer 100, powering off laptop computer 100, locking the hard drive within laptop computer 100, or any combination thereof. Consequently, while in the protect mode laptop computer 100 is protected from data theft because the hard drive is locked and laptop computer 100 is rendered useless because operations are suspended. Moreover, the hard drive may be, for example, password protected. Password protecting the hard drive means that a password is required to re-enable the hard drive after the hard drive is locked. The password may be, for example, stored on the hard drive itself. As a result, the hard drive will not work, even if placed within a different data processing system, without the correct password being entered by a user. Thus, data contained on the hard drive is protected from unauthorized access.

Also, after initial setup and enablement of the cable security mechanism within laptop computer 100, laptop computer 100 may require the user to enter a password before accessing the cable security options window again. A user may desire to access the cable security options window to, for example, change security options, such as disable the cable security mechanism, or change security settings, such as the password. Laptop computer 100 may, for example, only allow three incorrect password entries prior to entering the protect mode. However, it should be noted that the use of three incorrect password entries is only for illustration purposes. Illustrative embodiments may allow more or less incorrect password attempts prior to entering the protect mode. Laptop computer 100 displays the password entry window within video display terminal 104 and the user may enter the password via keyboard 106.

Thus, illustrative embodiments not only provide a physical deterrence to theft of laptop computer 100 by securing laptop computer to an immovable object, but also provide a method and system for disabling laptop computer 100 upon severance of embedded electrical wire 126 or removal of lock 116 from lock port 112, while the cable security mechanism is enabled within laptop computer 100, by disabling normal operation and powering off laptop computer 100. In addition, disabling normal operation of laptop computer 100 may also include locking the hard drive. As a result, data contained within laptop computer 100 is protected from unauthorized access even if the hard drive is placed within another computer because the hard drive is password protected. Consequently, if laptop computer 100 is disabled and rendered useless upon theft, a would-be thief is less likely to take laptop computer 100 in the first place. In addition, a "warning label" may be placed on laptop computer 100 to identify that laptop computer 100 is so protected and that normal operation of laptop computer 100 will cease upon theft.

Figure 2:
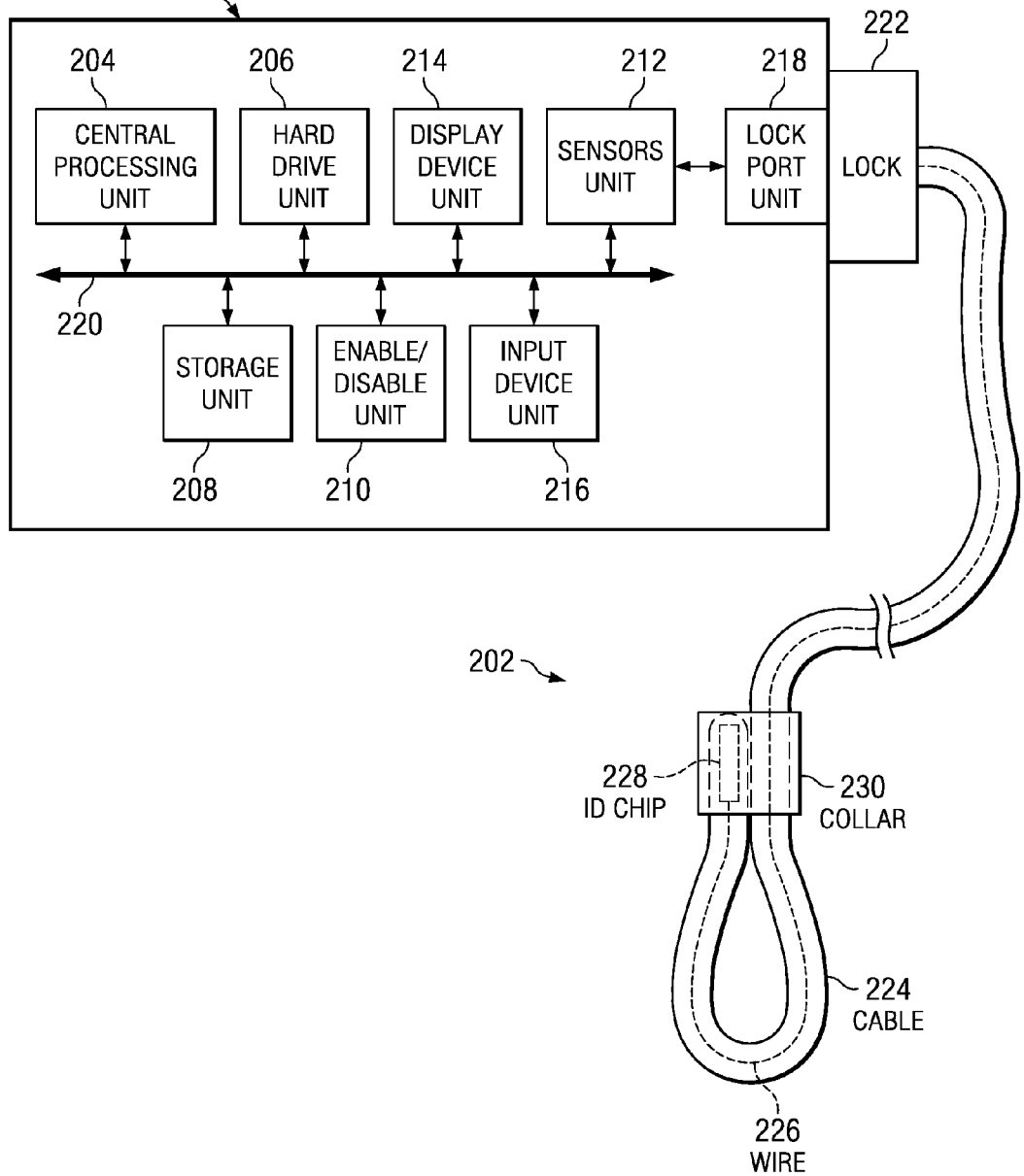
FIG. 2 is a block diagram of an exemplary electronic device coupled to a cable security system in accordance with an illustrative embodiment.

With reference now to FIG. 2, a block diagram of an exemplary electronic device coupled to a cable security system is depicted in accordance with an illustrative embodiment. Electronic device 200 may be, for example, laptop computer 100 in FIG. 1 in which code or instructions implementing the processes for different illustrative embodiments may be located, and cable security system 202 may be, for example, cable security system 114 in FIG. 1. Electronic device 200 includes central processing unit 204, hard drive unit 206, storage unit 208, enable/disable unit 210, sensors unit 212, display device unit 214, input device unit 216, and lock port unit 218. Cable security system 202 includes lock 222, cable 224, embedded wire 226, embedded identification chip 228, and collar 230. Collar 230, such as collar 122 in FIG. 1, is used to form a loop in the end of cable 224 and to protect embedded identification chip 228. However, it should be noted that electronic device 200 and cable security system 202 are only shown for illustrative purposes and are not intended as structural limitations of illustrative embodiments. Electronic device 200 and cable security system 202 may include more or fewer elements as required by illustrative embodiments.

Central processing unit 204, hard drive unit 206, storage unit 208, enable/disable unit 210, sensors unit 212, display device unit 214, input device unit 216, and lock port unit 218 are coupled together by bus system 220. Bus system 220 may be comprised of one or more buses. Of course, bus system 220 may be implemented using any type of communication fabric or architecture that provides for a transfer of data between different components or devices attached to the fabric or architecture.

Central processing unit 204 provides the processing or computing capabilities for electronic device 200. An operating system runs on central processing unit 204 and is used to coordinate and provide control of various components within electronic device 200. The operating system may be a commercially available operating system such as Windows® XP, which is available from Microsoft® Corporation. An object oriented programming system such as Java™ may run in conjunction with the operating system and provides calls to the operating system from Java™ programs or applications executing on electronic device 200. "Java" is a trademark of Sun Microsystems, Inc. Instructions for the operating system, the object-oriented programming system, and applications or programs are located in storage unit 208, and may be loaded into memory for execution by central processing unit 204. The processes of the illustrative embodiments are performed by central processing unit 204 using computer implemented instructions, which may be located in storage unit 208 or in one or more peripheral devices, such as, for example, a compact disc read only memory drive.

Those of ordinary skill in the art will appreciate that the hardware in FIG. 2 may vary depending on the implementation. Other internal hardware or peripheral devices, such as flash memory, equivalent nonvolatile memory, or optical disk drives and the like, may be used in addition to or in place of the hardware depicted in FIG. 2. Also, the processes of the depicted embodiments may be applied to a multiprocessor data processing system.

For example, electronic device 200 may be a personal digital assistant (PDA), which is configured with flash memory to provide non-volatile memory for storing operating system files and/or user-generated data. The depicted example in FIG. 2 and above-described examples are not meant to imply architectural limitations. For example, electronic device 200 also may be a tablet computer or telephone device in addition to taking the form of a PDA.

Electronic device 200 is coupled to cable security system 202 via lock port unit 218 and lock 222. For example, laptop computer 100 is coupled to cable security system 114 via lock port 112 and lock 116 in FIG. 1. Lock 222 is coupled to embedded identification chip 228 via embedded electrical wire 226. For example, lock 116 is coupled to embedded identification chip 124 via embedded electrical wire 126 in FIG. 1.

Consequently, after coupling electronic device 200 to cable security system 202, electronic device 200 uses sensors unit 212 to detect elements of cable security system 202. In particular, electronic device 200 uses sensors unit 212 to detect the presence of lock 222 in lock port 218 and to read the alphanumeric identification number contained within embedded identification chip 228 via embedded electrical wire 226. Subsequent to collecting this information, sensors unit 212 sends its output to enable/disable unit 210.

Enable/disable unit 210 analyzes this information and performs the appropriate action. For example, enable/disable unit 210 may compare the alphanumeric identification number read on embedded identification chip 228 to a stored alphanumeric identification number to determine if a match occurs between the two identification numbers. If a match occurs, then enable/disable unit 210 automatically enables electronic device 200 to operate. If a match does not occur, then enable/disable unit 210 automatically disables electronic device 200 from operating. Enable/disable unit 210 performs this comparison function during initial power on of electronic device 200. Optionally, after initial power on of electronic device 200, enable/disable unit 210 may continue to perform this comparison function at predetermined intervals during normal operation of electronic device 200 to determine if sensors 212 are still able to read the alphanumeric identification number contained in embedded identification chip 228.

In addition to automatically enabling and disabling electronic device 200, enable/disable unit 210 may automatically power off electronic device 200 upon theft. Enable/disable unit 210 determines theft by not finding a match between the read and stored alphanumeric identification numbers or by not finding an alphanumeric identification number for coupled cable security system 202 while the cable security mechanism is enabled within electronic device 200. The correct alphanumeric identification number that uniquely identifies cable security system 202 may be stored in storage unit 208. Storage unit 208 may be, for example, flash memory, which is a non-volatile data storage device that retains data when electronic device 200 is power off.

Further, electronic device 200 may utilize enable/disable unit 210 to lock hard drive unit 206 upon theft. Hard drive unit 206 may be the primary data storage medium, which may be made of one or more aluminum or glass platters coated with a ferromagnetic material, for electronic device 200. Hard drive unit 206 may be password protected for security of the data contained on hard drive unit 206. In addition, the password for hard drive unit 206 may be stored on hard drive unit 206 itself for increased security purposes.

Electronic device 200 uses display device unit 214, such as video display terminal 104 in FIG. 1, to display, for example, a password entry window and a cable security options window to a user. Also, electronic device 200 may utilize input device unit 216, such as keyboard 106 and/or pointer device 110 in FIG. 1, to input user data or selections within the displayed password and cable security widows. In addition, these display windows may employ touch screen capabilities, as well as, keyboard and mouse capabilities for user input.

Figure 3:
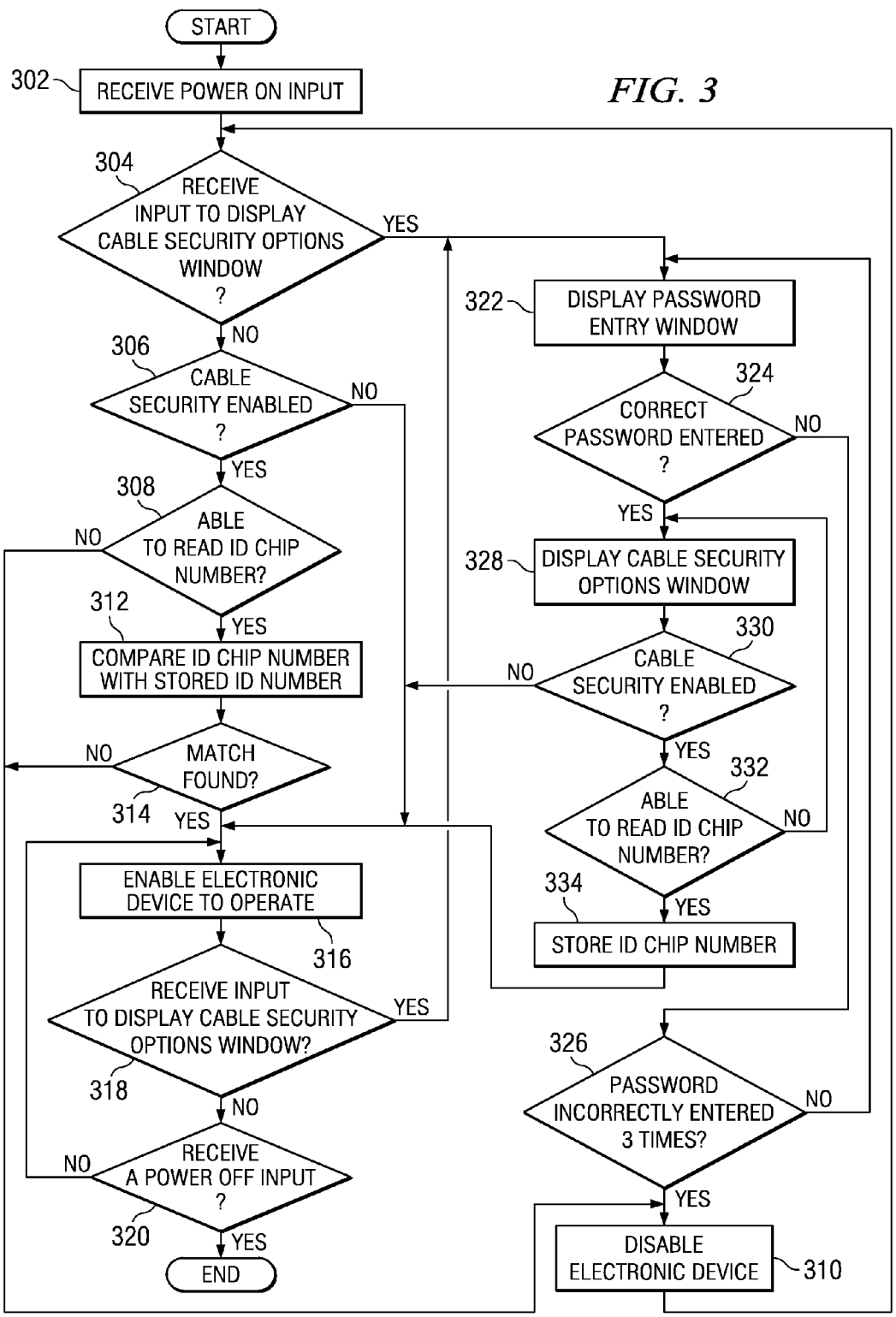
FIG. 3 is a flowchart illustrating an exemplary process for disabling an electronic device in accordance with an illustrative embodiment.

With reference now to FIG. 3, a flowchart illustrating an exemplary process for disabling an electronic device is depicted in accordance with an illustrative embodiment. The process depicted in FIG. 3 may be implemented in an electronic device, such as, for example, electronic device 200 in FIG. 2.

The process begins when the electronic device receives a power on input (step 302). After receiving the power on input in step 302, the electronic device makes a determination as to whether the electronic device receives a user input to display a cable security options window within a display screen, such as video display terminal 104 in FIG. 1 (step 304). For example, a user may utilize a user input device, such as pointer device 110 in FIG. 1, to select an option from within a menu toolbar drop-down list to display the cable security options window. Alternatively, the user may simply press a button on the electronic device to display the cable security options window.

If the electronic device does receive an input to display the cable security options window, yes output of step 304, then the process proceeds to step 322 where the electronic device displays a password entry window. If the electronic device does not receive an input to display the cable security options window, no output of step 304, then the electronic device makes a determination as to whether the cable security mechanism is enabled within the electronic device (step 306). If the cable security mechanism is not enabled within the electronic device, no output of step 306, then the process proceeds to step 316 where an enable/disable unit, such as enable/disable unit 210 in FIG. 2, enables the electronic device to operate. If the cable security mechanism is enabled, yes output of step 306, then the electronic device makes a determination as to whether sensors, such as sensors unit 212 in FIG. 2, can read an alphanumeric identification number contained in an embedded identification chip, such as embedded identification chip 228 in FIG. 2 (step 308).

If sensors cannot read the alphanumeric identification number on the embedded identification chip, no output of step 308, then the electronic device uses the enable/disable unit to disable normal operation of the electronic device (step 310). Disabling the electronic device may include halting normal operation and/or powering off of the electronic device. In addition, disabling the electronic device also may include locking a hard drive, such as hard drive unit 206 in FIG. 2, to prevent data theft. After the enable/disable unit disables normal operation of the electronic device in step 310, the process returns to step 304 where the electronic device makes a determination as to whether the electronic device receives a user input to display a cable security options window.

If sensors can read the alphanumeric identification number on the embedded identification chip, yes output of step 308, then the electronic device uses the enable/disable unit to compare the read alphanumeric identification number on the embedded identification chip with a stored alphanumeric number in non-volatile memory, such as storage 208 in FIG. 2 (step 312). After comparing the read and stored alphanumeric identification numbers in step 312, the electronic device makes a determination as to whether a match is found between the read and stored alphanumeric identification numbers (step 314).

If a match is not found, no output of step 314, then the process returns to step 310 where the electronic device uses the enable/disable unit to disable normal operation of the electronic device. If a match is found, yes output of step 314, then the enable/disable unit enables the electronic device to operate (step 316).

During normal operation of the electronic device, another illustrative embodiment may, for example, intermittently make a determination as to whether the electronic device is still able to read the alphanumeric identification number on the embedded identification chip. Similar to the output of step 308, if the electronic device is not able to continue to read the alphanumeric identification number during intermittent reading of the embedded identification chip, then the enable/disable unit disables normal operation of the electronic device. If the electronic device is still able to read the alphanumeric identification number during intermittent reading of the embedded identification chip, then the electronic device continues in normal operation.

Subsequent to enabling the electronic device to operate in step 316, the electronic device makes a determination as to whether the electronic device receives a user input to display a cable security options window (step 318). If the electronic device does receive an input to display the cable security options window, yes output of step 318, then the process proceeds to step 322 where the electronic device displays a password entry window. If the electronic device does not receive an input to display the cable security options window, no output of step 318, then the electronic device makes a determination as to whether the electronic device receives a power off input (step 320). If the electronic device does not receive a power off input, no output of step 320, then the process returns to step 316 where the electronic device continues to be enabled to operate. If the electronic device does receive a power off input, yes output of step 320, then the electronic device powers off and the process terminates thereafter.

Returning now to step 322 where the electronic device displays a password entry window within the display screen. A user using a keyboard, such as keyboard 106 in FIG. 1, enters a password into the displayed password entry window. The electronic device receives the password after the user, for example, depresses an enter key on the keyboard. Then, the electronic device makes a determination as to whether the correct password was entered by the user (step 324). If the correct password is not entered by the user, no output of step 324, then the electronic device makes a determination as to whether the password has been incorrectly entered three times (step 326). If the password has not been incorrectly entered three times, no output of step 326, then the process returns to step 322 where the electronic device again displays the password entry window. If the password has been incorrectly entered three times, yes output of step 326, then the process returns to step 310 where the enable/disable unit disables normal operation of the electronic device.

Returning again to step 324, if the correct password is entered, yes output of step 324, then the electronic device displays a cable security options window to the user for enabling or disabling the cable security mechanism and/or for changing the password (step 328). Of course it should be noted that illustrative embodiments are not restricted to the above-listed options within the cable security options window. The cable security options window may include other options, such as, for example, adding a new cable security system or deleting a cable security system.

Subsequent to displaying the cable security options window, the electronic device makes a determination as to whether the cable security mechanism is enabled (step 330). If the user does not enable the cable security mechanism, no output of step 330, then the process returns to step 316 where the enable/disable unit enables the electronic device to operate. If the user enables the cable security mechanism, yes output of step 330, then the electronic device makes a determination as to whether the electronic device is able to read the alphanumeric identification number on the embedded identification chip (step 332).

If the electronic device is not able to read the alphanumeric identification number on the embedded identification chip, no output of step 332, then the process returns to step 328 where the electronic device displays the cable security options window. If the electronic device is able to read the alphanumeric identification number on the embedded identification chip, yes output of step 332, then the electronic device stores the alphanumeric identification number on the embedded identification chip in the non-volatile memory (step 334). After storing the alphanumeric identification number on the embedded identification chip in step 334, the process returns to step 316 where the enable/disable unit enables the electronic device to operate.

It should be noted that the exemplary process depicted in FIG. 3 is only intended as an illustration and not as a limitation for illustrative embodiments. Illustrative embodiments may include more or fewer steps depending on the illustrative embodiment.

Thus, illustrative embodiments provide a method, system, and computer usable program code for disabling an electronic device upon theft. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for disabling a device, the method comprising:
providing a cable security system having a cable security mechanism provided within the device and a security cable having a proximal end connected to the device and the cable security mechanism, and a distal end forming a securement for attachment to a fixture;
responsive to enabling the cable security mechanism within the device, reading by the device an embedded identifier contained in an embedded identification chip located within the distal end of the security cable of the cable security system via an embedded electrical wire within the security cable; and
disabling the device if embedded identifier is not found.

2. The method of claim 1, further comprising:
comparing the embedded identifier to a stored identifier to determine whether a match occurs;
enabling the device to operate if a match occurs; and
disabling the device from operating if a match does not occur.

3. The method of claim 2, wherein the embedded identifier and the stored identifier are a unique alphanumeric identification number associated with the cable security system.

4. The method of claim 1, wherein the embedded identification chip located within the distal end of the security cable is connected to an I²C Bus.

5. The method of claim 1, wherein the security cable includes a locking mechanism located on the proximal end of the security cable.

6. The method of claim 5, wherein the security cable includes the embedded electrical wire running from the locking mechanism to the embedded identification chip located within the distal end of the security cable.

7. The method of claim 6, wherein the device uses the embedded electrical wire to read the embedded identifier when the device is coupled to the cable security system and the cable security mechanism is enabled.

8. The method of claim 7, wherein the device is disabled when the embedded electrical wire is severed.

9. The method of claim 5, wherein the locking mechanism is coupled to the device, and wherein uncoupling the locking mechanism from the device disables the device when the cable security mechanism is enabled.

10. The method of claim 1, wherein the disabling step includes locking a hard drive to form a locked hard drive, and wherein the locked hard drive is password protected, and wherein a password is stored within the locked hard drive, and wherein the password is required to re-enable the locked hard drive to operate.

11. The method of claim 2, wherein the device intermittently compares the embedded identifier to the stored identifier at predetermined intervals during normal operation of the device after initial power on to determine whether a match occurs during normal operation of the device when the cable security mechanism is enabled.

12. A system for disabling a device, comprising:
a bus system;
a storage device connected to the bus system, wherein the storage device includes a set of instructions;
a cable security mechanism provided within the device and a security cable having a proximal end connected to the device and the cable security mechanism, and a distal end forming a securement for attachment to a fixture; and
a processing unit connected to the bus system, wherein the processing unit executes the set of instructions to read by the device an embedded identifier contained in an embedded identification chip located within the distal end of the security cable of the cable security system via an embedded electrical wire within the security cable in response to enabling the cable security mechanism within the device and disable the device if the embedded identifier is not found.

13. The system of claim 12, wherein the processing unit executes a further set of instructions to compare the embedded identifier to a stored identifier to determine whether a match occurs, enable the device to operate if a match occurs, and disable the device from operating if a match does not occur.

14. The system of claim 13, wherein the stored identifier is stored in a non-volatile memory within the device.

15. The system of claim 14, wherein the embedded identifier is stored in the non-volatile memory when the device is powered off.

16. The system of claim 12, wherein the cable security mechanism includes a sensors unit, an enable/disable unit, and a storage unit, and wherein the sensors unit is used to read the embedded identifier, and wherein the enable/disable unit is used to enable and disable operation of the device, and wherein the storage unit is used to store a copy of the embedded identifier.

17. The system of claim 12, wherein the device is at least one of a laptop computer, personal computer, personal digital assistant, television, projector, stereo, or digital video disc player.

18. A computer program product stored in a tangible computer usable storage medium having computer usable program code embodied therein for disabling a device, the computer program product comprising:
computer usable program code configured to read an embedded identifier contained in an embedded identification chip located within a distal end of a security cable of a cable security system via an embedded electrical wire within the security cable in response to enabling a cable security mechanism within the device,
wherein the cable security system comprises the cable security mechanism and the security cable, the security cable having a proximal end connected to the device and the cable security mechanism, and the distal end forming a securement for attachment to a fixture; and
computer usable program code configured to disable the device if the embedded identifier is not found.

19. The computer program product of claim 18, further comprising:
computer usable program code configured to compare the embedded identifier to a stored identifier to determine whether a match occurs;
computer usable program code configured to enable the device to operate if a match occurs; and
computer usable program code configured to disable the device from operating if a match does not occur.

* * * * *